(12) United States Patent
Van Den Berg et al.

(10) Patent No.: US 6,407,197 B1
(45) Date of Patent: Jun. 18, 2002

(54) AQUEOUS DISPERSION OF A POLYMER

(75) Inventors: Hendrik J. Van Den Berg, Schinnen; Mathijs H. G. Maassen, Stein; Laurentius W. Steenbakkers, Susteren, all of (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/654,502

(22) Filed: Sep. 1, 2000

Related U.S. Application Data

(63) Continuation of application No. PCT/NL99/00112, filed on Mar. 3, 1999.
(60) Provisional application No. 60/101,556, filed on Sep. 22, 1998.

(30) Foreign Application Priority Data

Mar. 4, 1998 (NL) .............................. 1008469

(51) Int. Cl.⁷ .............................. C08F 2/16; C08F 8/32; C08L 33/00
(52) U.S. Cl. ........................ 528/170; 528/392; 528/322; 528/499; 526/262; 525/217; 525/221; 525/262; 525/282; 525/285; 162/135; 162/164.1; 162/164.6; 162/168.1; 162/168.2; 162/173; 162/175; 524/26; 524/47; 524/272; 524/800; 524/802
(58) Field of Search .................. 528/392, 499, 528/170, 322; 526/262; 524/47, 272, 800, 802; 525/217, 221, 262, 282, 285; 162/168.1, 168.2, 135, 164.1, 164.6, 173, 175

(56) References Cited

U.S. PATENT DOCUMENTS

| | | | | |
|---|---|---|---|---|
| 4,221,886 A | * | 9/1980 | Töpfl | 525/329 |
| 4,381,367 A | * | 4/1983 | von Bonin et al. | 524/549 |

FOREIGN PATENT DOCUMENTS

| | | |
|---|---|---|
| DE | 3819968 A | 6/1989 |
| DE | 4112535 A | 10/1992 |
| DE | 4342157 A | 6/1995 |
| DE | 3430802 A | 3/1998 |
| EP | 0728767 A | 8/1996 |
| EP | 855407 A1 * | 7/1998 |
| FR | 2369380 | 5/1978 |
| JP | 60243102 | 12/1985 |
| WO | WO9617050 | 9/1978 |

* cited by examiner

*Primary Examiner*—P. Hampton-Hightower
(74) *Attorney, Agent, or Firm*—Pillsbury Winthrop, LLP

(57) ABSTRACT

Aqueous dispersion of a polymer, which polymer has been obtained by subjecting a starting polymer which contains maleic anhydride monomer units and vinyl aromatic monomer units to an imidization reaction, the starting polymer containing 7–50 mole % maleic anhydride monomer units and the imidization reaction having been carried out in such a way that at most 75% of the maleic anhydride monomer units has been imidized.

16 Claims, No Drawings

AQUEOUS DISPERSION OF A POLYMER

This application claims the benefit of U.S. Provisional Application No. 60/101,556, filed Sep. 22, 1998.

This application is a continuation of PCT/NL99/00112 filed Mar. 3, 1999.

The invention relates to an aqueous dispersion of a polymer, which polymer has been obtained by subjecting a starting polymer which contains maleic anhydride monomer units and vinyl aromatic monomer units to an imidization reaction. The invention also relates to a process for the preparation of the dispersion, to the use of the dispersion in a paper-sizing composition, and to the use of the paper-sizing composition for the production of paper.

Aqueous dispersions of a polymer, which polymer has been obtained by subjecting a starting polymer which contains maleic anhydride monomer units and vinyl aromatic monomer units to an imidization reaction, are known from DE-A-1720746. The polymer in the known dispersions is obtained from a copolymer of styrene and maleic anhydride, and after it has been subjected to the imidization reaction it contains no more, or virtually no more, maleic anhydride monomer units.

A drawback of the known dispersions is that use of these dispersions in a paper-sizing composition does not lead to a paper-sizing composition that adequately reduces the water-absorption-property of paper, and furthermore use of this paper-sizing composition does not result in paper with good ink-jet printing properties, such as, for instance, wicking, bleeding and blackness. The invention aims to provide a dispersion that does not have said drawbacks.

Surprisingly, this aim is achieved in that the starting polymer contains 7–50 mole % of maleic anhydride monomer units and the imidization reaction has been carried out in such a way that at most 75% of the monomer units of maleic anhydride has been imidized.

The dispersion according to the invention can very well be used to obtain a paper-sizing composition that sufficiently reduces the water-absorption property of paper, and in addition use of this composition results in paper with good ink-jet printing properties. The paper-sizing compositions according to the invention are particularly suitable for surface sizing. A paper-sizing composition containing the dispersion according to the invention also exhibits good foaming behaviour, i.e. little foaming occurs during use of the composition.

It is noted that the German patent specification DE-A-4342157 also discloses an aqueous dispersion with good properties for use in paper-sizing compositions. The dispersion disclosed in said patent specification is prepared by imidizing maleic anhydride monomer units (MA) in a styrene-maleic anhydride copolymer (SMA) to at least 90% with a mixture containing various amines, amino alcohol and a volatile organic acid. According to the introduction to the specification of said patent this mixture is needed to impart good paper-sizing properties to the dispersion. A drawback of these known dispersions is that relatively many different and rather specific chemicals are needed for their preparation, and that there are highly specific requirements as to the composition.

Dispersion is here understood to be a continuous liquid phase with discrete polymer particles.

In a preferred embodiment of the dispersion according to the invention 50–70% of the maleic anhydride monomer units of the starting polymer has been imidized.

The starting polymer used to prepare the dispersion contains maleic anhydride (MA) monomer units and vinyl aromatic monomer units. Suitable vinyl aromatic monomer units are, for instance, styrene and alpha-methylstyrene. The starting polymer preferably contains styrene monomer units. Besides monomer units MA and vinyl aromatic monomer units, the starting polymer may contain other monomer units.

A copolymer containing vinyl aromatic monomer units and MA monomer units can be prepared using the known processes, for instance using the process described for the preparation of a copolymer of maleic anhydride and styrene monomer units, by Hanson and Zimmerman, Ind. Eng. Chem., vol. 49, No. 11 (1957), pp. 1803–1807. Preferably, the starting polymer contains 18–50 mole % maleic anhydride monomer units and 50–82 mole % styrene monomer units. More preferably, the starting polymer contains 22–36 mole % maleic anhydride monomer units and 64–78 mole % styrene monomer units. The molar weight of the starting polymer may vary within wide limits. Preferably, a starting polymer has a weight-average molecular weight of between 50,000 and 180,000 kg/kmol.

In a possible process for the preparation of an aqueous dispersion according to the invention the starting polymer is introduced into an autoclave together with an aqueous solution of $NH_3$ or an amine, the temperature being at least 95° C., the molar ratio of maleic anhydride monomer units and $NH_3$, or maleic anhydride and amine, being between 1:0.8 and 1:5, and the pressure being so high that the aqueous solution does not start to boil. The time needed for at most 75% imidization of the maleic anhydride monomer units in the starting polymer depends on the chosen temperature, the reactor, the amounts started from, and the like, and can readily be determined by experiment. The imidization reaction can be stopped, or at any rate be strongly slowed down, by reducing the temperature to below 95° C.

In a preferred embodiment of the process, the temperature is between 100 and 130° C. since at that temperature a dispersion that is very well defined in terms of properties and composition can be obtained with a high reproducibility. The molar ratio of maleic anhydride monomer units and $NH_3$ or maleic anhydride and amine is preferably between 1:1.5 and 1:2.5. Preferably, use is made of ammonia or an aliphatic amine, which aliphatic amine is a primary amine. Examples of suitable amines are butylamine and stearylamine.

It is possible to add an emulsifier to the reaction mixture. Addition of an emulsifier promotes the formation of the dispersion according to the invention.

Examples of suitable emulsifiers are the sodium salt of $(C_{10}–C_{13})$ alkyl-benzene sulphonic acid, stearyl dimethyl-benzyl ammonium chloride and ethylene oxide-propylene oxide copolymers.

The dispersion according to the invention is very suitable for forming part of paper-sizing compositions. Besides a dispersion according to the invention paper-sizing compositions contain one or more of the usual additives. Preferably, starch is used as an additive. The amount of dispersion contained in the composition is so large that the amount of polymer, i.e. the dry weight of polymer particles in the dispersion, is for instance between 0.2 and 10 wt. %, relative to the dry weight of the other customary additives. Preferably, a paper-sizing composition contains between 2 and 6 wt. % of dry weight of polymer particles, relative to the dry weight of starch. A composition can for instance be prepared by adding a certain amount of the dispersion according to the invention to a solution of the other additives in water.

The invention will be elucidated with reference to examples, without however being limited thereto.

EXAMPLES AND COMPARATIVE EXPERIMENTS

Preparation of Dispersions

A number of dispersions was prepared by introducing 3.0 kg of an SMA polymer consisting of 26 wt. % maleic anhydride monomer units and 74 wt. % styrene monomer units (SMA sz26080 (DSM, The Netherlands), with an intrinsic viscosity of 0.35 dl/g (0.2 g SMA per dl tetrahydrofuran (THF), 25° C.), with a solution of $NH_3$ in demineralized water into a 10-litre autoclave. The autoclave was provided with a stirrer and with means for drawing samples from the reactor during the reaction. $N_2$ was then used to raise the autoclave pressure to 6 bar ($6.10^5$ Pa). Stirring took place at a speed of 200–215 rpm. The autoclave was heated at a rate of 4°/minute until the desired reaction temperature had been reached. This caused the pressure to increase. After a certain time the imidization reaction was stopped by lowering the reaction temperature to 50° C. Table 1 presents the amounts of starting material used and the other reaction parameters for a number of dispersions according to the invention. The reaction time stands for the time between the moment the reaction temperature is reached and the moment cooling is started.

C=O group of the imide group (around 1712 $cm^{-1}$)
C—N stretch vibrations of imide group (around 1183 $cm^{-1}$) (also referred to as amide III)
C=O of carboxylate group (around 1555 $cm^{-1}$) and
C—N stretch vibration of primary amide (around 1405 $cm^{-1}$).

By stating which vibrations of the molecules are responsible for the various absorption bands, it is unambiguously clear which absorption bands are to be measured.

The absorptions of the aromatic ring of the polymer backbone (around 1493 $cm^{-1}$) do not change as a result of the imidization reaction upon an increase in reaction time. The absorptions caused by imide monomer units, on the other hand, increase in relative size and the absorptions caused by the ammonium salts of amide acid groups decrease in relative size when the reaction time increases. Amide acid groups are formed from the maleic anhydride monomer units, the anhydride ring of which opens in a basic solution of $NH_3$, upon which a primary amide and an acid group are formed, which together are called amide acid. In a basic environment the acid group of the amide acid donates a proton to ammonia, so that an ammonium salt of the amide acid group is formed. All maleic anhydride monomer units

TABLE 1

Data relating to the preparation of dispersions

| Examples | reaction temperature (° C.) | reaction time (min) | $NH_3$/maleic anhydride (molar ratio) | 25% $NH_3$ solution (litres) | $H_2O$ (l) | $P_{reactor, max.}$ (bar) | degree of imidization (%) |
|---|---|---|---|---|---|---|---|
| Dispersion I*,** | 100 | 720 | 2.02 | 1.23 | 10.77 | 7 | 59 |
| Dispersion II | 149 | 25 | 2.09 | 1.27 | 10.87 | 10.5 | 65 |
| Comp. Exp. Dispersion A | 170 | 75 | 2.04 | 1.24 | 10.77 | 14 | 89 |

*The measuring method for the degree of imidization is described under "Characterization of dispersions"
**All dispersions have a solids content of 20 wt. %.

Dispersions I and II in the Examples of Table I are dispersions according to the invention. The dispersion in the Comparative Experiment, dispersion A, is a dispersion according to the state of the art.

Table I shows that the degree of imidization increases with the reaction temperature and/or reaction time of the imidization reaction.

Determination of the Degree of Imidization

The degree of imidization of the aqueous dispersions was measured by means of Fourier Transform Infrared Spectroscopy (FTIR). Use was made of a Perkin Elmer spectrum 2000 spectrophotometer or a Perkin Elmer 1760 FTIR spectrophotometer. The aqueous dispersions were measured directly, using a liquid Attenuated Total Reflection (ATR) cell (window: ZnSe, angle of incidence 45°). The spectra were recorded with the standard parameter settings:
resolution: 4 $cm^{-1}$
data interval: 1 $cm^{-1}$
gain: 1
wavelength: 4000–400 $cm^{-1}$ Using the same cell and the same conditions, a background spectrum of water was recorded. This background spectrum was "deducted" from the other spectra (compensated at the peak maximum of the water signal (around 1630 $cm^{-1}$)) so as to reduce the interfering effect of water on the area most relevant to these measurements (between 1800 and 1100 $cm^{-1}$). The absorptions considered were those caused by:
aromatic ring (around 1493 $cm^{-1}$)

in the starting polymer thus undergo a change during the preparation of the dispersions.

To be able to quantify the percentage of maleic anhydride monomer units that has been converted into imide monomer units, the peak heights of the said absorption bands were measured at their maximum, and as reference samples use was made of an aqueous ammonia solution of SMA (26 mole % maleic anhydride, 74 mole % styrene, $NH_3$:maleic anhydride molar ratio=3:1, prepared at 50° C., no imide monomer units) and an imidized SMA powder. The imidized SMA powder was prepared by mixing 2 g SMA (28 wt. % maleic anhydride; 72 wt. % styrene monomer units, molar weight 110,000 kg/mol) with 0.50 g urea in a twin-screw miniextruder at 240° C. for 5 minutes, at a speed of 100 rpm. The glass transition temperature of the imidized SMA powder was 193° C.

Via a KBr specimen an IR spectrum of the imidized SMA polymer was recorded on a Perkin Elmer Paragon 1600 infrared spectrophotometer. From the absence of absorption peaks caused by anhydride groups it was concluded that the SMA had been fully imidized. The IR spectrum of the solution was measured in the same way as the spectra of the dispersions. The absorptions of the imidized SMA powder were converted to 26 wt. % maleic anhydride and 76 wt. % styrene monomer units.

The degree of imidization was calculated by successively passing through a number of steps. First the absorption level measured in the peak maximum at 1712 $cm^{-1}$, 1555 $cm^{-1}$, 1405 $cm^{-1}$ and 1183 $cm^{-1}$, respectively, was divided by the peak height of the absorption at 1493 cm$^{-1}$, from the same spectrum. In the same way, relative peak heights were determined for the SMA solution and the imidized SMA powder. Then the relative peak heights of the dispersions were divided by the relative peak heights of the references at the wavelength in question. After that, the figures thus obtained related to the peak heights at 1555 and 1405 cm$^{-1}$ were deducted from 1 and subsequently multiplied by 100%, and the figures thus obtained, related to the peak heights at 1183 and 1712 cm$^{-1}$, were multiplied by 100%. Of the four values obtained the average was calculated. The average value indicates the imidization percentage, that is to say, the percentage of maleic anhydride monomer units of the maleic anhydride monomer units originally present that has been imidized.

Use of Dispersions in Paper-sizing Compositions
Paper-sizing Compositions

Paper-sizing compositions were prepared by successively dissolving 10 wt. % starch, relative to the amount of demineralized water, in demineralized water, and adding a dispersion as described in Table 1 to the resulting solution, in such a way that the quantity of the polymer (in dry condition) amounted to 4 wt. % of the quantity of starch (in dry condition). Tests were conducted with two different types of starch: Amylis 108 (supplied by Roquette, of France), which starch is an oxidized potato starch, and with SEP, an ester-modified potato starch. 20 g of the paper-sizing composition was applied per m$^2$ of paper, which corresponds to 2 g/m$^2$ of polymer and starch, use being made of a size press. A size press comprises two abutting rolls. In between the rolls, above their contact area, there is a kind of slot, for the rolls touch one another only at the widest point. In that slot, at the top between the two rolls, the paper-sizing composition is applied. In order to apply the paper-sizing composition to paper, a sheet of paper was pulled through the two rolls, the sheet thus passing first through the paper-sizing composition and then being pulled between the two rolls. As paper a wood-free basis paper was used, which had internally been sized with an alkene-ketene dimer (AKD) and which had a Cobb$_{60}$ value of 30 g/m$^2$.

Measurement of Paper Properties

The water-absorption capacity of paper was measured according to DIN EN 205353, and expressed as the Cobb$_{60}$ value, in g/m$^2$. For good results with water-soluble ink, the Cobb$_{60}$ value should be relatively low. The printing properties, such as wicking, bleeding and blackness, were determined using a Hewlett-Packard (HP) 560 ink-jet printer, according to the HP test criteria for a HP 560 printer (available from Hewlett Packard), the ink being water-soluble ink suitable for an HP ink-jet printer of the type used. The printing property "wicking" is a measure of the definition of the edges of characters printed on paper, and "bleeding" is a measure of the running off of the characters (that is to say, of the ink used to print the characters on the paper). When different colours of ink are used in adjoining areas, bleeding may lead to mixing of colours at the interfaces of different colour areas. Another criterion is the blackness of characters printed with a black ink containing carbon black or with a combination of different colours of ink, which combination is black to the eye, on a sheet of paper treated with the paper-sizing composition. In general, a deep black colour of the characters is preferred to a less black or even grey colour.

From Table 2 it appears that use of compositions containing a dispersion according to the invention results in paper having a lower Cobb$_{60}$ value and better printing properties than paper treated with a paper-sizing composition that contained a dispersion according to the state of the art.

TABLE 2

Results of the use of paper-sizing compositions containing one of the dispersions I, II or A, as described in Table 1

| | Starch: Amylis 108 (oxidized potato starch) | | | | | Starch: SEP (ester-modified potato starch) | | | | |
|---|---|---|---|---|---|---|---|---|---|---|
| | Cobb$_{60}$ (g/m$^2$) | Wicking** | Bleeding** | Blackness*** combi carbon | black | Cobb$_{60}$ (g/m$^2$) | Wicking** | Bleeding** | Blackness*** combi carbon | black |
| Examples* | | | | | | | | | | |
| Composition containing dispersion I | 25 | b | b | 1.08 | 1.29 | 23 | a | b | 1.05 | 1.32 |
| Composition containing dispersion II | 25 | b | b | 1.11 | 1.31 | 29 | a | b | 1.07 | 1.32 |
| Comparative Experiment | | | | | | | | | | |
| Composition containing dispersion A | 41 | c | b/c | 1.08 | 1.24 | 41 | c | b/c | 1.08 | 1.24 |

*dispersions I and II are dispersions according to the invention
**a = good; b = acceptable; c = unacceptable
***combi = black ink on the basis of colour mixture; carbon black = black ink containing carbon black

What is claimed is:

1. An aqueous dispersion comprising;
   a polymer comprising
   i. 7 to 50 mole % maleic anhydride monomer units, and
   ii. vinyl aromatic monomer units,
   wherein at most 75% of the maleic anhydride monomer units are imidized.

2. The dispersion of claim 1, wherein the polymer comprises 18 to 50 mole % maleic anhydride units and 50 to 82 mole % styrene monomer units.

3. The dispersion of claim 1, wherein the polymer comprises 22 to 36 mole % maleic anhydride units and 64 to 78 mole % styrene monomer units.

4. The dispersion of claim 1, wherein from 50 to 70% by weight, of the maleic anhydride monomer units are imidized.

5. The dispersion of claim 4, wherein the polymer has a weight-average molecular weight of from 50,000 to 180,000 kg/mol.

6. The dispersion of claim 3, wherein the polymer has a weight-average molecular weight of from 50,000 to 180,000 kg/mol.

7. The dispersion of claim 2, wherein the polymer has a weight-average molecular weight of from 50,000 to 180,000 kg/mol.

8. A process for preparing an aqueous dispersion, comprising
  forming a starting polymer comprising
    i. 7 to 50 mole % maleic anhydride monomer units, and
    ii. vinyl aromatic monomer units, and
  imidizing at most 75% of the maleic anhydride monomer units by contacting said starting polymer with $NH_3$ or an amine.

9. Process according to claim 8, wherein the imidation reaction is carried out at a temperature of at least 95° C.

10. Process according to claim 8, wherein the imidation reaction is carried out at a temperature of from 100 to 130° C.

11. Process according to claim 8, wherein the molar ratio of maleic anhydride monomer units and $NH_3$ or amine is from 1:1.5 to 1:2.5.

12. Paper sizing composition comprising an aqueous dispersion as set forth in claim 1, and at least one paper sizing additive.

13. Paper sizing composition according to claim 12, which contains starch and from 2 to 6 wt. %, based on the starch, of polymer particles.

14. Sized paper, sized with the paper sizing composition as set forth in claim 13.

15. Sized paper, sized with the paper sizing composition as set forth in claim 12.

16. The dispersion of claim 1, wherein the starting polymer has a weight-average molecular weight of from 50,000 to 180,000 kg/mol.

* * * * *